United States Patent
Wormald et al.

(10) Patent No.: US 8,606,248 B2
(45) Date of Patent: Dec. 10, 2013

(54) ADVERTISING SERVER FOR DELIVERING TARGETED ADVERTISEMENTS TO A MOBILE WIRELESS DEVICE AND ASSOCIATED METHODS

(75) Inventors: Chris Wormald, Kitchener (CA); Jason Griffin, Kitchener (CA)

(73) Assignee: BlackBerry Limited, Waterloo, Ontario (CA)

( * ) Notice: Subject to any disclaimer, the term of this patent is extended or adjusted under 35 U.S.C. 154(b) by 398 days.

(21) Appl. No.: 12/394,909

(22) Filed: Feb. 27, 2009

(65) Prior Publication Data

US 2010/0222036 A1 Sep. 2, 2010

(51) Int. Cl.
*G06Q 30/00* (2012.01)

(52) U.S. Cl.
USPC ............... 455/414.3; 455/414.1; 705/14.49; 705/14.53; 705/14.67

(58) Field of Classification Search
USPC ............... 455/414.1; 340/539.12; 379/93.01; 705/10, 14.5, 14.69
See application file for complete search history.

(56) References Cited

U.S. PATENT DOCUMENTS

| | | | |
|---|---|---|---|
| 2005/0227679 A1* | 10/2005 | Papulov | 455/414.3 |
| 2006/0217110 A1* | 9/2006 | Othmer | 455/414.1 |
| 2007/0666287 | 3/2007 | Papulov | |
| 2007/0088851 A1* | 4/2007 | Levkovitz et al. | 709/246 |
| 2007/0116227 A1* | 5/2007 | Vitenson et al. | 379/207.02 |
| 2007/0242626 A1* | 10/2007 | Altberg et al. | 370/259 |
| 2007/0262860 A1* | 11/2007 | Salinas et al. | 340/539.12 |
| 2008/0152097 A1* | 6/2008 | Kent | 379/93.01 |
| 2009/0006180 A1 | 1/2009 | Hameen-Anttila | 705/10 |
| 2009/0046704 A1* | 2/2009 | Sternam | 370/352 |
| 2009/0122728 A1* | 5/2009 | Aaltonen et al. | 370/259 |
| 2009/0147778 A1* | 6/2009 | Wanless et al. | 370/389 |
| 2009/0182616 A1* | 7/2009 | Ho et al. | 705/10 |

FOREIGN PATENT DOCUMENTS

| | | |
|---|---|---|
| CN | 1411581 | 4/2003 |
| CN | 101138258 | 3/2008 |

* cited by examiner

*Primary Examiner* — Jinsong Hu
*Assistant Examiner* — Nathan Taylor
(74) *Attorney, Agent, or Firm* — Allen, Dyer, Doppelt, Milbrath & Gilchrist, P.A.

(57) ABSTRACT

A communications system includes at least one mobile wireless communications device for contacting a given entity having a telephone number associated therewith and an advertising server. The advertising server is configured to identify the given entity based upon the telephone number and identifying at least one property associated with the given entity. The advertising server is also configured to selectively send a targeted advertisement to the at least one mobile wireless device based upon the at least one property.

23 Claims, 5 Drawing Sheets

ADVERTISING SERVER FOR DELIVERING TARGETED ADVERTISEMENTS TO A MOBILE WIRELESS DEVICE AND ASSOCIATED METHODS

TECHNICAL FIELD

The present disclosure relates to the field of targeted advertising, and, more particularly, to the delivery of targeted advertisement to mobile wireless devices and related methods.

BACKGROUND

The pervasiveness of electronic communication and, in particular, mobile wireless communication, has led to a desire for the delivery of advertising to mobile wireless communications devices. In some applications, mobile advertising on such mobile wireless communications devices may be similar to more traditional advertising venues, such as television, radio, and print. For example, a mobile wireless communications device that has the capability of displaying video to a user may display a pre-recorded advertisement to the user. Indeed, a television commercial may even be displayed to the user. Similarly, a mobile wireless communications device may play a pre-recorded audio advertisement (such as a radio ad) to a user prior to the user making a telephone call.

There are, however, some fundamental differences between traditional advertising venues and mobile wireless communications devices. For example, most television programs cater to a specific demographic (e.g. males aged 18-35) and advertising displayed during those programs can be directed to products or services that may be desirable to those in that demographic. Differently, mobile wireless communications devices are used by members of many demographics.

To deliver advertisements to those users who may be interested in purchasing the goods and/or services being advertised, advances in mobile advertising that attempt to identify characteristics of the user and deliver advertising based thereupon may be desirable.

DETAILED DESCRIPTION

The present description is made with reference to the accompanying drawings, in which various embodiments are shown. However, many different embodiments may be used, and thus the description should not be construed as limited to the embodiments set forth herein. Rather, these embodiments are provided so that this disclosure will be thorough and complete. Like numbers refer to like elements throughout, and prime notation is used to indicate similar elements or steps in alternative embodiments.

Generally speaking, a communications system may comprise at least one mobile wireless communications device configured to contact a given entity having a telephone number associated therewith and an advertising server. The advertising server may also be configured to identify the given entity based upon the telephone number and identify at least one property associated with the given entity. The advertising server may be configured to selectively send a targeted advertisement to the at least one mobile wireless device based upon the at least one property. This communication system advantageously provides a way of delivering personalized and targeted advertisements to a user of the mobile wireless communications device.

The advertising server may be configured to store a contact history for the at least one mobile wireless communications device. Additionally or alternatively, the advertising server may be configured to selectively send the targeted advertising based upon the contact history. Storing the contact history may enable the selection and sending of the targeted advertisement to the at least one mobile wireless communications device based upon usage patterns that are tracked over a period of time. This may enable the advertising server to predict when a user may contact a certain business or type thereof and send a targeted advertisement to mobile wireless communications device before the user has a chance to do so.

In addition, the advertising server may be configured to store identities of accepted advertisers and may selectively send the targeted advertisement based upon those accepted advertisers. Storing the accepted advertisers may further include storing advertisements from the accepted advertisers. This may allow potential advertisers to place or accept bids for the delivery of targeted advertisements to the mobile wireless communications device. The accepted advertisers may be entities that have placed a winning bid for a certain type of advertisement, for example. The accepted advertisers may also be entities that have accepted a bid.

Furthermore, the advertising server may be configured to identify the given entity based upon a separate communication with the at least one mobile wireless communications device. For example, the at least one mobile wireless communications device may communicate a telephone number it has contacted to the advertising server.

The advertising server may, additionally or alternatively, be configured to identify the given entity based upon a communication between said at least one mobile wireless communications device and the given entity. This may enable the advertising server to directly identify the telephone number being contacted by the at least one mobile wireless communications device in the absence of a separate communication therefrom, for example.

The at least one property may comprise a business category. In addition, the advertising server may selectively send the targeted advertisement based upon a duration of the corresponding contact. Moreover, the advertising server may selectively send the targeted advertisement based upon at least one of a date or a time of a prior contact.

The advertising server may be configured to selectively send the targeted advertisement during the corresponding contact. This may prompt a user to terminate the contact with the given entity and instead initiate a contact with an entity suggested by the targeted advertisement.

In some applications, the advertising server may be configured to selectively send the targeted advertisement after the corresponding contact. This may prompt a user to initiate a contact with an entity suggested by the targeted advertisement rather than the given entity, at some point in the future. The targeted advertisement may be at least one of an audio message or a visual message.

Another aspect is directed to an advertising server to cooperate with at least one mobile wireless communications device for contacting a given entity having a telephone number associated therewith. The advertising server may include a reverse look-up module for identifying the given entity based upon the telephone number and identifying at least one property associated with the given entity. An advertising module may be for selectively sending a targeted advertisement to the at least one mobile wireless device based upon the at least one property. The advertising server may further comprise a database module for storing a contact history for the at least one mobile wireless communications device. The advertising module may further selectively send the targeted advertising based upon the contact history. The advertising server may further comprise a bidding module for storing accepted advertisers. The advertising module may further selectively send the targeted advertisement based upon the accepted advertisers.

The advertising server may comprise a processor and a memory. The reverse look-up module, the advertising module, the database module, and the bidding module may each be stored in the memory and executed by the processor.

A method aspect is directed to a method of using an advertising server to send a targeted advertisement to at least one mobile wireless communications device. The method may comprise identifying a given entity based upon a telephone number associated therewith being contacted by the at least one mobile wireless communications device and identifying at least one property associated with the given entity. The method may also include selectively sending the targeted advertisement to the at least one mobile wireless device based upon the at least one property.

Yet another aspect is directed to a computer readable medium to store computer executable modules for use by an advertising server to cooperate with at least one mobile wireless communications device for contacting a given entity having a telephone number associated therewith. The computer executable modules comprise a computer executable reverse look-up module to identify the given entity based upon the telephone number and identify at least one property associated with the given entity. A computer executable advertising module is to selectively send a targeted advertisement to the at least one mobile wireless device based upon the at least one property.

A computer executable database module is for storing a contact history for the at least one mobile wireless communications device. The computer executable advertising module further selectively sends the targeted advertising based upon the contact history. A computer executable bidding module is for storing accepted advertisers. The computer executable advertising module further selectively sends the targeted advertisement based upon the accepted advertisers.

Figure 1A:
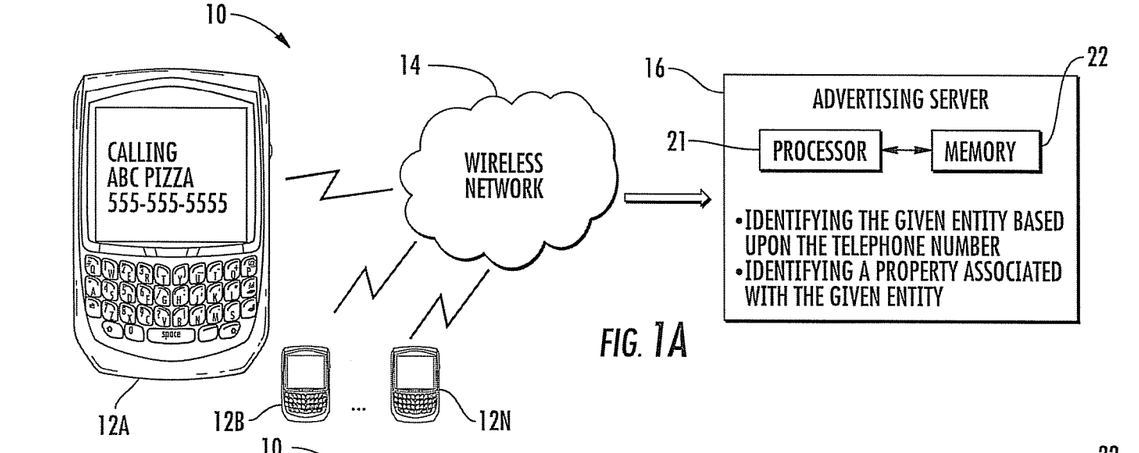
FIG. 1A is a schematic block diagram a communications system during a first operating phase in accordance with the present embodiment.
Figure 1B:
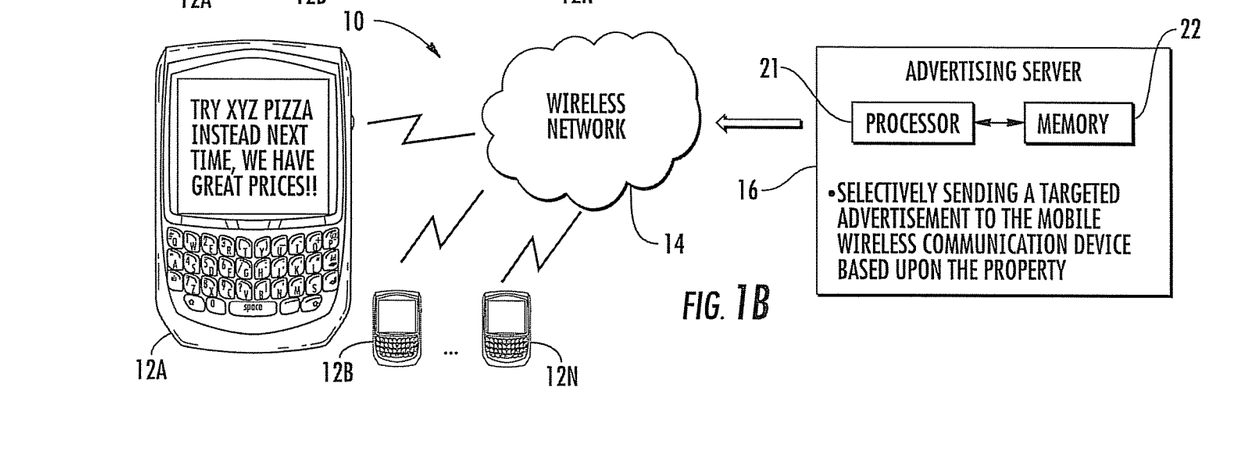
FIG. 1B is a schematic block diagram of the communications system of FIG. 1A during a second operating phase.
Figure 2:
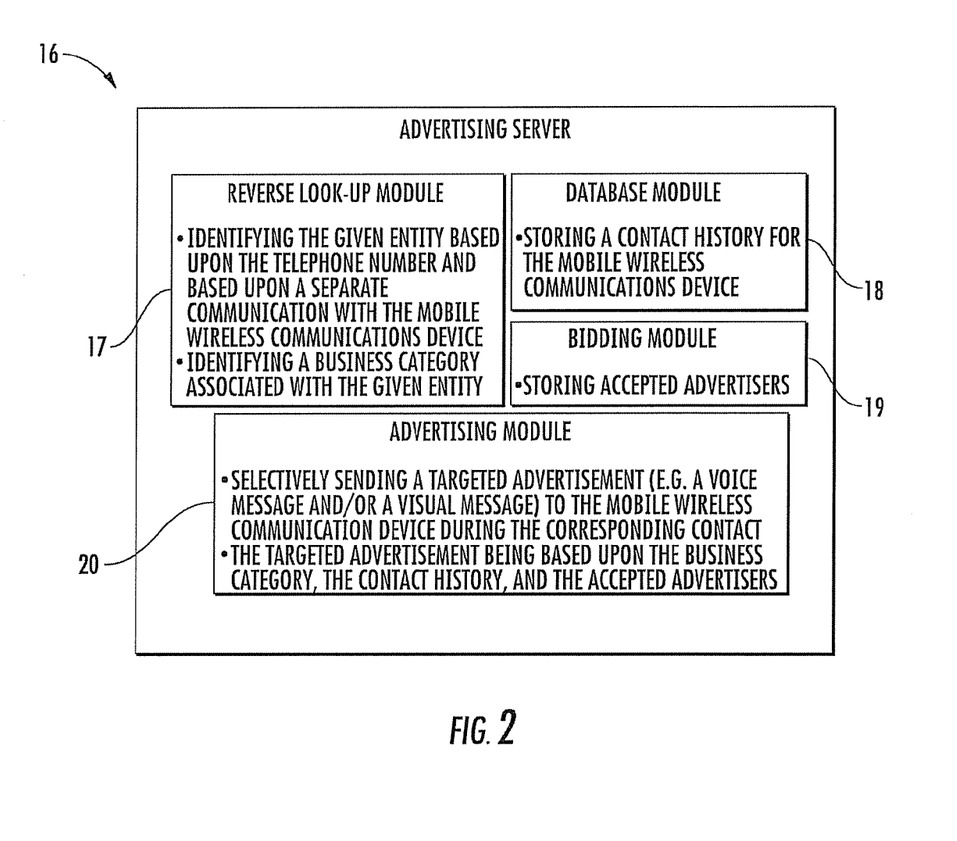
FIG. 2 is a more detailed schematic block diagram of the advertising server of the communications system as shown in FIGS. 1A and 1B.

Referring initially to FIGS. 1A-1B, and 2, a communications system 10 is now described. The communications system 10 includes a plurality of mobile wireless communications devices 12a, 12b, . . . 12n, each for contacting a given entity having a telephone number associated therewith. There may be a single mobile wireless communications device 12a rather than a plurality thereof in some embodiments. The mobile wireless communications device 12a, or devices 12a -12n, may each comprise a cellular telephone, personal digital assistant (PDA), portable computer, a vehicle capable of wireless communication, or another suitable device. The mobile wireless communications devices 12a -12n may each comprise a different device (e.g. one may be a cellular telephone, one may be a laptop computer, and one may be a PDA). For clarity of explanation, only the single mobile wireless communications device 12a will be referred to hereinafter.

The mobile wireless communications device 12a may contact the given entity by placing a voice call thereto. Additionally or alternatively, the mobile wireless communications device may contact the given entity by sending a short message service (SMS) message, facsimile, or multimedia messaging service (MMS) message thereto.

The mobile wireless communications device 12a, as shown in FIG. 1A, is illustratively placing a voice call to ABC Pizza, which has a phone number of 555-555-5555, through the wireless network 14. The wireless network 14 may comprise a cellular network and may employ at least one cellular protocol, such as Global System for Mobile Communications (GSM) or Code Division Multiple Access (CDMA). Those skilled in the art will understand that cellular protocols such as the GSM and CDMA may enable the sending and receiving of SMS and MMS messages and may provide connectivity with the internet. The wireless network 14 may additionally or alternatively comprise a wireless data network employing a wireless protocol, such as Wi-Fi or WiMAX. The mobile wireless communications device 12a may place the call via a cellular network or via a voice over IP connection, for example.

An advertising server 16 comprises a processor 21 and a memory 22. The advertising server 16 receives the phone number and identifies the given entity (ABC Pizza, in this example) based thereupon. Further details of how the advertising server 16 receives the phone number are contained below. The advertising server 16 also identifies a property associated with the given entity. In this case, one property associated with ABC Pizza is its business category or type. ABC Pizza, in this example, is a pizza restaurant. Once the advertising server 16 has identified the property associated with the given entity, it selectively sends a targeted advertisement based upon the property to the mobile wireless communication device 12a over the wireless network 14. The advertising server 16 may selectively send the targeted advertisement to the mobile wireless communications device 12a immediately, or, alternatively, may selectively send the targeted advertisement at a later point in time.

The advertising server 16 may communicate wirelessly with the wireless network 14 or, alternatively, may communicate with a wired node of the wireless network. In the illustrated example, the targeted ad is visually displayed on a screen of the mobile wireless communications device 12a of FIG. 1B and advertises a competitor's product or service. In the present example, the targeted ad displays the message, "TRY XYZ PIZZA INSTEAD NEXT TIME, WE HAVE GREAT PRICES!!" The telephone number or other contact information may also be included.

The advertising server 16 may identify the given entity by a variety of ways. The advertising server 16 may perform a reverse look-up of the telephone number, for example. To perform the reverse look-up, the advertising server 16 may interface with a reverse look-up or greypages directory. The reverse look-up or greypages directory may be a database stored in or on the advertising server 16, or may be a database stored externally to the advertising server.

The advertising server 16 may also perform the reverse look-up by interfacing with the mobile wireless communications device 12a via the wireless network 14. If the given entity is stored as a contact number in an address book store of the mobile wireless communications device 12a, for example, the contact name associated with that contact number may be communicated to the advertising server 14.

Those of skill in the art will appreciate that that the given entity may have other properties in addition to, or instead of, a business category. These other properties may include a physical location of the entity, or a contact name associated with the given entity and stored in the mobile wireless communications device 12a, for example.

The property may also be a rule or a set of rules associated with the given entity. By way of example, a rule may be that if the given entity is Cable Company A, a targeted ad for Cable Company B should be sent by the advertising server 16 to the mobile wireless communications device 12a. A rule may be more specific. For example, the rule may be that if the given entity is Cable Company A, and the mobile wireless communications device 12a has placed an outgoing call to Company A a predetermined number of times (for example, at least three times) within a predetermined time period (for example, within the past thirty days), a targeted ad for Cable Company B should be sent by the advertising server 16 to the mobile wireless communications device 12a.

Indeed, such rules may be based upon both the frequency of calls to a given entity and a duration of those calls to the given entity. As another example, the rule may be that if the given entity is Cable Company A, and the mobile wireless communications device 12a is currently engaged in a call therewith for more than a certain period of time, a targeted ad for Cable Company B should be sent by the advertising server 16 to the mobile wireless communications device. Still another example rule may be merely that the mobile wireless communications device 12a has contacted a given entity at all (e.g. if the mobile wireless communications device has called the service center of Cable Company A, the advertising server should send an ad for Cable Company B thereto).

The advertising server 16 may identify the property associated with the given entity by a variety of methods. By way of example, the advertising server 16 may look up the given entity in a database stored in or on the advertising server. Such a database may also be stored externally to the advertising server and may or may not be part of the communications system 10. Alternatively the property may be communicated by the mobile wireless communications device 12a to the advertising server 16 via the wireless network 14.

The advertising server 16 may communicate with the wireless network 14 via a wired connection to at least one component thereof. This communication may be indirect. For example, the advertising server 16 may communicate with at least one wired component of the wireless network 14 through the Internet.

The advertising server 16 illustratively comprises a reverse look-up module 17, a database module 18, a bidding module 19, and an advertising module 20. The reverse look-up module 17 identifies the given identity based upon the telephone number and based upon a separate communication with the mobile wireless communications device 12a. The reverse look-up module 17 also identifies a business category associated with the given entity.

The illustrated reverse look-up module 17 may learn the telephone number from such a separate communication with the mobile wireless communications device 12a. For example, each time an outgoing call is placed using the mobile wireless communications device 12a, it may send the phone number of the outgoing call to the reverse look-up module 17 via the Internet. Alternatively, the mobile wireless communications device 12a may store a log of outgoing phone calls and may upload a copy of the log to the reverse look-up module 17 a given number of times per day.

The illustrated database module 18 stores a contact history for the mobile wireless communications device 12a. This contact history may include a plurality of telephone numbers and/or entities contacted by the mobile wireless communications device 12a. The contact history may additionally or alternatively include at least one property associated with an entity contacted by the mobile wireless communications device 12a. If the database module 18 is to store contact history for a plurality of mobile wireless communications devices 12a -12n, it may keep a separate contact history for each mobile wireless communications device 12a -12n. The database module 18 may keep a separate contact history for certain ones of the plurality of mobile wireless communications devices 12a -12n.

In some applications, it may be desirable for the database module 18 to erase contact history older than a desired number of days or months, so as to protect a user's privacy. For example, the database module 18 may erase contact history of each mobile wireless communications device 12a -12n that is older than a predetermined time period, for example, three months.

The illustrated bidding module 19 stores identities of accepted advertisers. For example, advertisers who would like targeted advertisements for their products or services sent to the mobile wireless communications device 12a may place a bid with the bidding module 19 indicating how much they are willing to pay for the sending of their targeted advertisements. If the bidding module accepts the bid, the advertiser is deemed an accepted advertiser. Similarly, the bidding module may make bids or offers for the sending of targeted advertisements that can be accepted by advertisers. If an advertiser accepts the bid, the advertiser is also deemed an accepted advertiser. As will be explained in detail below, the targeted advertisements may be sent to the mobile wireless communications device 12a based upon the accepted advertisers.

The advertising module 20 may selectively send a targeted advertisement to the mobile wireless communications device 12a during the corresponding contact. The targeted advertisement may be based upon the business category, the contact history, and the accepted advertisers. That is, the advertising module 20 may selectively send the targeted advertisement to the mobile wireless communications device 12a during an outgoing call to the given entity which the business category is associated with. By way of example, if a user is currently engaged in a voice telephone call with Cable Company A, an advertisement for a competitor, e.g., Cable Company B, may be sent to the user's mobile wireless communications device 12a.

Those skilled in the art will understand that basing the targeted advertisement upon the accepted advertiser(s) means sending to the mobile wireless communications device 12a the targeted advertisement of the accepted advertiser who placed a winning bid or accepted a bid.

The targeted advertisement may include at least one of text, visual content, or audio content. The targeted advertisement may be sent to the mobile wireless communications device 12a by a variety of suitable ways, as will be appreciated by those skilled in the art. For example the targeted advertisement may be sent to the mobile wireless communications device 12a by SMS message, MMS message, voicemail message, e-mail message, peer-to-peer message, or through the internet. In some applications, a user may take affirmative action to view or listen to the targeted advertisement (e.g. view a SMS message, listen to a voicemail). In other applications, the targeted advertisement may be displayed upon the mobile wireless communications device 12*a* in the absence of user input. For example, the targeted advertisement may be an unobtrusive ticker display scrolling across the display of the mobile wireless communications device 12*a* or may be more obtrusive, taking up a majority of the display.

Those of skill in the art will appreciate that the targeted advertisement may cause the mobile wireless communications device 12*a* to launch an application to view the targeted advertisement. For example, the targeted advertisement may include a video file and may cause the mobile wireless communications device 12*a* to launch a video viewing application to view the video. As another example, the targeted advertisement may include a web page or a link thereto and may cause the mobile wireless communications device 12*a* to launch a web browser to view the web page.

Another embodiment of an advertising server 16' as may be used with the communications system 10 described above is now described with reference to FIG. 3. The advertising server 16' comprises a reverse look-up module 17', a database module 18', a bidding module 19', and an advertising module 20'. The reverse look-up module 17' identifies the given identity based upon the telephone number and based upon a communication between the mobile wireless communications device 12*a* and the given entity. The reverse look-up module 17' also identifies at least one property associated with the given entity.

Figure 3:
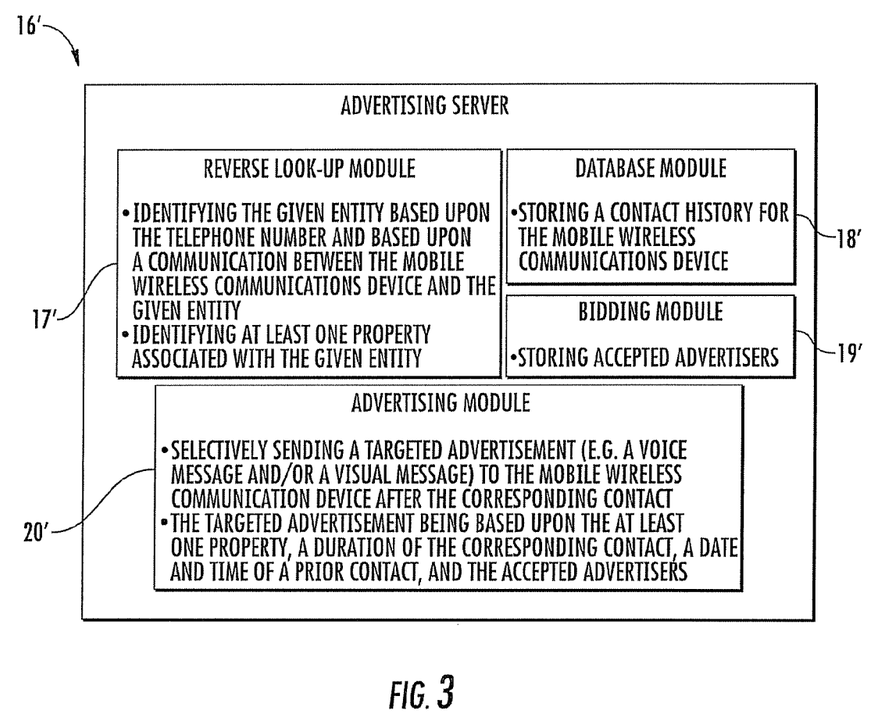
FIG. 3 is a more detailed schematic block diagram of another embodiment of an advertising server as may be used in the communications system of FIGS. 1A and 1B.

The illustrated reverse look-up module 17' may learn the telephone number from a communication between the mobile wireless communications device 12*a* and the given entity. For example, each time an outgoing call is placed using the mobile wireless communications device 12*a*, the reverse look-up module 17' may determine the phone number by monitoring a cellular or wireless network. This may be useful if the advertising server 16' is to be operated by a cellular carrier, for example.

The illustrated database module 18' stores a contact history for the mobile wireless communications device. The illustrated bidding module 19' stores accepted advertisers.

The illustrated advertising module 20' selectively sends a targeted advertisement (e.g. an audio message and/or a visual message) to the mobile wireless communications device 12*a* after the corresponding contact. For example, after a contact between the mobile wireless communications device 12*a* and ABC Pizza is competed, the advertising module 20' may send an advertisement for XYZ Pizza to the corresponding mobile wireless communications device.

The targeted advertisement is based upon the at least one property, a date and time of a prior contact, and the accepted advertisers. The targeted advertisement may also be based upon the duration of the corresponding contact.

For example, if the given entity is ABC Pizza, the at least one property may be that ABC Pizza is a pizza restaurant. The contact history stored in the database module 18' for the mobile wireless communications device 12*a* may show that a user thereof typically calls a pizza restaurant on Saturday evenings at 6 pm. XYZ. Pizza may have placed a winning bid. Therefore, a targeted advertisement for XYZ Pizza may be sent to the mobile wireless communications device 12*a* prior to 6 pm on Saturday. This may influence the user of the mobile wireless communications device 12*a* to call XYZ Pizza instead of ABC Pizza or another pizza restaurant.

As another example, if the given entity is Cable Company A, the at least one property may be that the number dialed is the technical support department of Cable Company A. The contact history stored in the database module 18' for the mobile wireless communications device 12*a* may show that the length of the contact with the technical support department of Cable Company A was 45 minutes. Cable Company B may have placed a winning bid. Therefore, a targeted advertisement for Cable Company B may be sent to the mobile wireless communications device 12*a* during a specified period of time after it has been in contact with the technical support department of Cable Company A for more than 45 minutes.

The advertising servers 16, 16' may each comprise a computer having a processor, a memory, and a hard drive. The advertising servers 16, 16' may each further comprise one or more computer executable modules stored on the respective hard drives. The one or more computer executable modules may each be executed by the processor. These computer executable modules may also be stored on other computer readable mediums, such as compact discs (CDs) and digital versatile discs (DVDs).

Similarly, the various modules shown as residing on the advertising servers 16, 16' may each be implemented as computer executable modules stored in the hard drive of a computer and executed by the processor thereof. The various modules shown as residing on the advertising server 16, 16' may also be stored on other computer readable mediums, such as compact discs (CDs) and digital versatile discs (DVDs).

Alternatively, the various modules may be spread across different servers or machines, as will be appreciated by those skilled in the art. It is to be understood that if the advertising servers 16, 16' or modules thereof are implemented as computer executable modules, such computer executable modules define structural and functional interrelationships with the executing computer that permit the functionality of the computer executable modules to be realized.

Figure 4:
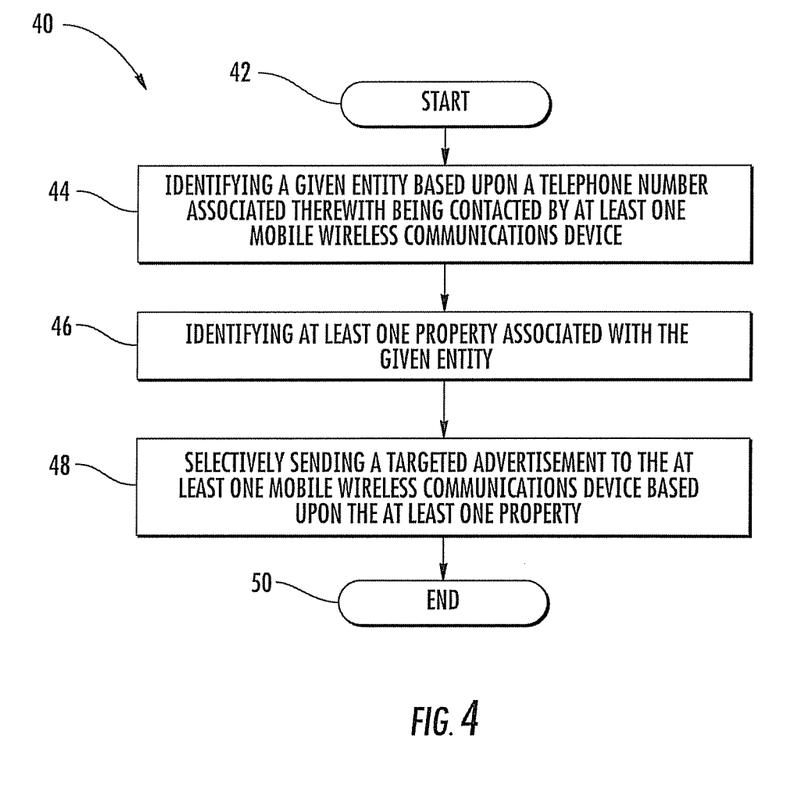
FIG. 4 is a flow chart illustrating a method of operating the communications system of FIGS. 1A and 1B.

With reference to flowchart 40 of FIG. 4, a method of using an advertising server to send a targeted advertisement to at least one mobile wireless communications device is now described. After the start (Block 42), at Block 44, a given entity is identified base upon a telephone number associated therewith being contacted by at least one mobile wireless communications device. At Block 46, at least one property associated with the given entity is identified. At Block 48, a targeted advertisement is selectively sent to the at least one mobile wireless communications device based upon the at least one property. Block 50 indicates the end of the method.

Exemplary components of a hand-held mobile wireless communications device 1000 that may be used in accordance with the communications system 10 are further described in the example below with reference to FIG. 5. The device 1000 illustratively includes a housing 1200, a keypad 1400 and an output device 1600. The output device shown is a display 1600, which may comprise a full graphic LCD. In some embodiments, display 1600 may comprise a touch-sensitive input and output device. Other types of output devices may alternatively be utilized. A processing device 1800 is contained within the housing 1200 and is coupled between the keypad 1400 and the display 1600. The processing device 1800 controls the operation of the display 1600, as well as the overall operation of the mobile device 1000, in response to actuation of keys on the keypad 1400 by the user. In some embodiments, keypad 1400 may comprise a physical keypad or a virtual keypad (e.g., using a touch-sensitive interface) or both.

The housing 1200 may be elongated vertically, or may take on other sizes and shapes (including clamshell housing structures). The keypad 1400 may include a mode selection key, or other hardware or software for switching between text entry and telephony entry.

Figure 5:
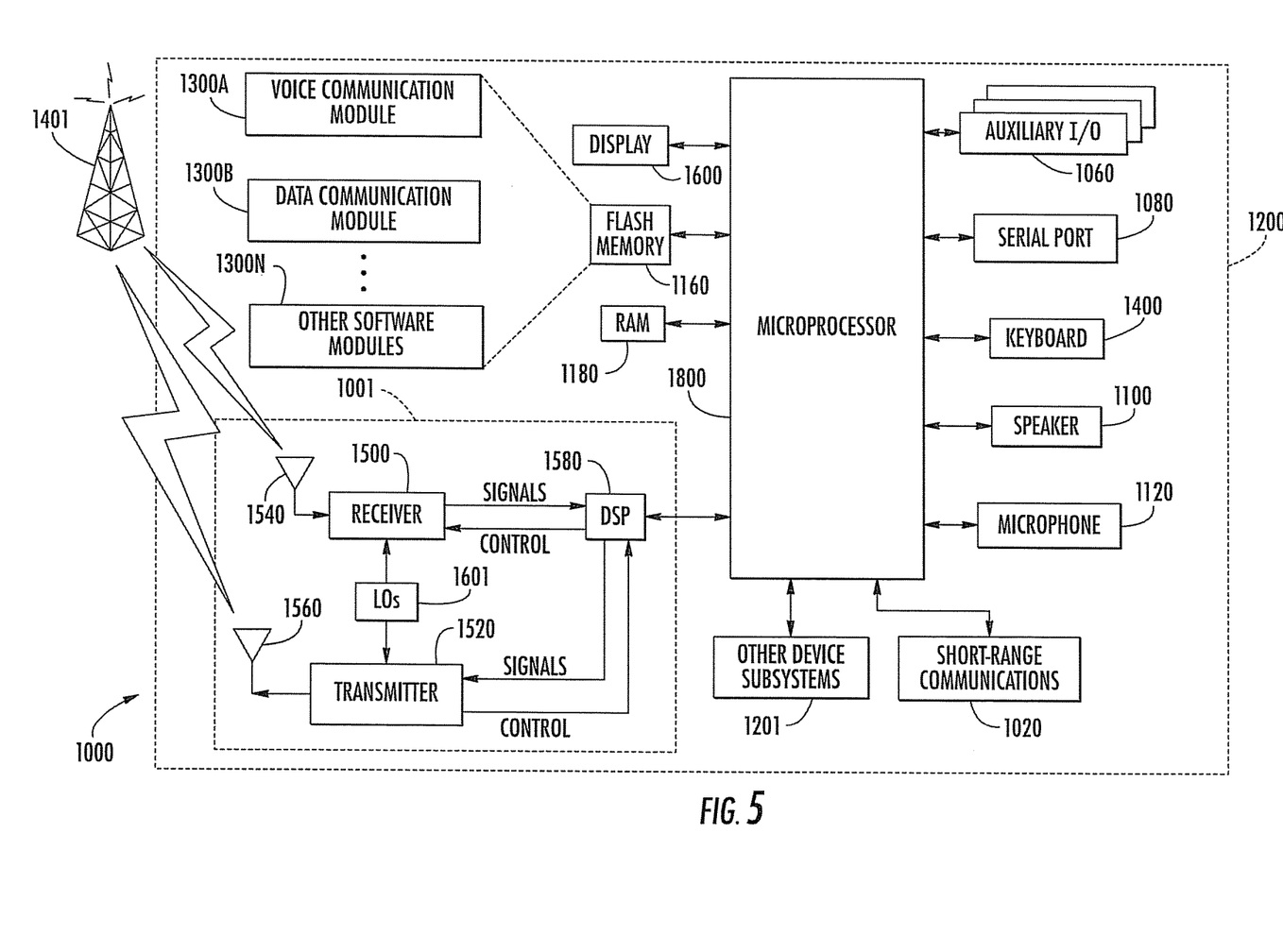
FIG. 5 is a schematic block diagram illustrating exemplary components of a mobile wireless communications device that may be used with the communications system disclosed in FIGS. 1A and 1B.

In addition to the processing device 1800, other parts of the mobile device 1000 are shown schematically in FIG. 5. These include a communications subsystem 1001; a short-range communications subsystem 1020; the keypad 1400 and the display 1600, along with other input/output devices 1060, 1080, 1100 and 1120; as well as memory devices 1160, 1180 and various other device subsystems 1201. The mobile device 1000 may comprise a two-way RF communications device having voice and data communications capabilities. In addition, the mobile device 1000 may have the capability to communicate with other computer systems via the Internet.

Operating system software executed by the processing device 1800 may be stored in a persistent store, such as the flash memory 1160, but may be stored in other types of memory devices, such as a read only memory (ROM) or similar storage element. In addition, system software, specific device applications, or parts thereof, may be temporarily loaded into a volatile store, such as the random access memory (RAM) 1180. Communications signals received by the mobile device may also be stored in the RAM 1180.

The processing device 1800, in addition to its operating system functions, enables execution of software applications 1300A-1300N on the device 1000. A predetermined set of applications that control basic device operations, such as data and voice communications 1300A and 1300B, may be installed on the device 1000 during manufacture. In addition, a personal information manager (PIM) application may be installed during manufacture. The PIM may be capable of organizing and managing data items, such as e-mail, contacts, calendar events, voice mails, appointments, and task items. The PIM application may also be capable of sending and receiving data items via a wireless network 1401. The PIM data items may be seamlessly integrated, synchronized and updated via the wireless network 1401 with the device user's corresponding data items stored or associated with a host computer system.

Communication functions, including data and voice communications, are performed through the communications subsystem 1001, and possibly through the short-range communications subsystem. The communications subsystem 1001 includes a receiver 1500, a transmitter 1520, and one or more antennas 1540 and 1560. In addition, the communications subsystem 1001 also includes a processing module, such as a digital signal processor (DSP) 1580, and local oscillators (LOs) 1601. The specific design and implementation of the communications subsystem 1001 is dependent upon the communications network in which the mobile device 1000 is intended to operate. For example, a mobile device 1000 may include a communications subsystem 1001 designed to operate with the Mobitex™, Data TAC™ or General Packet Radio Service (GPRS) mobile data communications networks, and also designed to operate with any of a variety of voice communications networks, such as AMPS, TDMA, CDMA, WCDMA, PCS, GSM, EDGE, etc. Other types of data and voice networks, both separate and integrated, may also be utilized with the mobile device 1000. The mobile device 1000 may also be compliant with other communications standards such as 3GSM, 3G, UMTS, 4G, etc.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore utilizes a subscriber identity module, commonly referred to as a SIM card, in order to operate on a GPRS network.

When required network registration or activation procedures have been completed, the mobile device 1000 may send and receive communications signals over the communication network 1401. Signals received from the communications network 1401 by the antenna 1540 are routed to the receiver 1500, which provides for signal amplification, frequency down conversion, filtering, channel selection, etc., and may also provide analog to digital conversion. Analog-to-digital conversion of the received signal allows the DSP 1580 to perform more complex communications functions, such as demodulation and decoding. In a similar manner, signals to be transmitted to the network 1401 are processed (e.g. modulated and encoded) by the DSP 1580 and are then provided to the transmitter 1520 for digital to analog conversion, frequency up conversion, filtering, amplification and transmission to the communication network 1401 (or networks) via the antenna 1560.

In addition to processing communications signals, the DSP 1580 provides for control of the receiver 1500 and the transmitter 1520. For example, gains applied to communications signals in the receiver 1500 and transmitter 1520 may be adaptively controlled through automatic gain control algorithms implemented in the DSP 1580.

In a data communications mode, a received signal, such as a text message or web page download, is processed by the communications subsystem 1001 and is input to the processing device 1800. The received signal is then further processed by the processing device 1800 for an output to the display 1600, or alternatively to some other auxiliary I/O device 1060. A device user may also compose data items, such as e-mail messages, using the keypad 1400 and/or some other auxiliary I/O device 1060, such as a touchpad, a rocker switch, a thumb-wheel, track ball, or some other type of input device. The composed data items may then be transmitted over the communications network 1401 via the communications subsystem 1001.

In a voice communications mode, overall operation of the device is substantially similar to the data communications mode, except that received signals are output to a speaker 1100, and signals for transmission are generated by a microphone 1120. Alternative voice or audio I/O subsystems, such as a voice message recording subsystem, may also be implemented on the device 1000. In addition, the display 1600 may also be utilized in voice communications mode, for example to display the identity of a calling party, the duration of a voice call, or other voice call related information.

The short-range communications subsystem enables communication between the mobile device 1000 and other proximate systems or devices, which need not necessarily be similar devices. For example, the short-range communications subsystem may include an infrared device and associated circuits and components, or a Bluetooth™ communications module to provide for communication with similarly-enabled systems and devices.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A communications system comprising:
    at least one mobile wireless communications device for contacting a given entity having a telephone number associated therewith, via an outgoing communication; and
    an advertising server for
        storing identities of accepted advertisers,
        storing a contact history for said at least one mobile wireless communications device,
        identifying the given entity contacted by the outgoing communication based upon the telephone number,
        identifying at least one property associated with the given entity and comprising a business category,
        predicting a contact with the given entity based upon the contact history,
        selectively sending a targeted advertisement to said at least one mobile wireless device based upon the at least one property, the accepted advertisers, and the predicted contact.

2. The communications system of claim 1 wherein said advertising server identifies the given entity based upon a separate communication with said at least one mobile wireless communications device.

3. The communications system of claim 1 wherein said advertising server identifies the given entity based upon a communication between said at least one mobile wireless communications device and the given entity.

4. The communications system of claim 1 wherein said advertising server further selectively sends the targeting advertisement based upon a duration of the corresponding contact.

5. The communications system of claim 1 wherein said advertising server further selectively sends the targeted advertisement based upon at least one of a date and a time of a prior contact.

6. The communications system of claim 1 wherein said advertising server selectively sends the targeted advertisement during the corresponding contact.

7. The communications system of claim 1 wherein said advertising server selectively sends the targeted advertisement after the corresponding contact.

8. The communications system of claim 1 wherein the targeted advertisement comprises at least one of an audio message and a visual message.

9. An advertising server to cooperate with at least one mobile wireless communications device for contacting a given entity having a telephone number associated therewith, via an outgoing communication, the advertising server comprising:
    a processor and at least one memory cooperating therewith to
        store accepted advertisers,
        store a contact history for the at least one mobile wireless communications device,
        identify the given entity contacted by the outgoing communication based upon the telephone number,
        identify at least one property associated with the given entity and comprising a business category,
        predict a contact with the given entity based upon the contact history,
        selectively send a targeted advertisement to the at least one mobile wireless device based upon the at least one property, the accepted advertisers, and the predicted contact.

10. A method of using an advertising server to send a targeted advertisement to at least one mobile wireless communications device comprising:
    storing identities of accepted advertisers;
    storing a contact history for said at least one mobile wireless communications device;
    identifying a given entity based upon a telephone number associated therewith being contacted by the at least one mobile wireless communications device via an outgoing communication;
    identifying at least one property associated with the given entity and comprising a business category;
    predicting a contact with the given entity based upon the contact history,
    selectively sending the targeted advertisement to the at least one mobile wireless device based upon the at least one property, the accepted advertisers, and the predicted contact.

11. The method of claim 10 wherein the targeted advertisement is also selectively sent based upon a duration of the corresponding contact.

12. The method of claim 10 wherein the targeted advertisement is also selectively sent based upon at least one of a date and a time of a prior contact.

13. A non-transitory computer readable medium to store computer executable modules for use by an advertising server to cooperate with at least one mobile wireless communications device for contacting a given entity having a telephone number associated therewith, via an outgoing communication, the computer executable modules comprising:
    a computer executable bidding module for storing accepted advertisers;
    a computer executable database module for storing a contact history for the at least one mobile wireless communications device;
    a computer executable reverse look-up module to
        identify the given entity contacted by the outgoing communication based upon the telephone number,
        identify at least one property associated with the given entity and comprising a business category, and
        predict when a user may contact the given entity based upon the contact history; and
    a computer executable advertising module to selectively send a targeted advertisement to the at least one mobile wireless device based upon the at least one property, the accepted advertisers, and the prediction.

14. An advertising server to cooperate with at least one mobile wireless communications device for contacting a given entity having a telephone number associated therewith, via an outgoing communication, the at least one mobile wireless communications device having a contact list stored thereon, the advertising server comprising:
    processor and at least one memory cooperating therewith to
        store identities of accepted advertisers,
        identify the given entity contacted by the outgoing communication based upon a reverse look-up of the telephone number in the contact list via a separate communication with the at least one mobile wireless communications device,
        identify at least one property associated with the given entity and comprising a business category, and
        selectively send a targeted advertisement to the at least one mobile wireless device based upon the at least one property and the accepted advertisers.

15. The advertising server of claim 14 wherein said processor and at least one memory further cooperate to store a contact history for the at least one mobile wireless communications device, and selectively send the targeted advertising based upon the contact history.

16. The advertising server of claim 14 wherein said processor and at least one memory further cooperate to selectively send the targeted advertisement based upon at least one of a date and a time of a prior contact.

17. The advertising server of claim 14 wherein the targeted advertisement comprises at least one of an audio message and a visual message.

18. An advertising server to cooperate with at least one mobile wireless communications device for contacting a given entity having a telephone number associated therewith, via an outgoing communication, the advertising server comprising:
    a processor and at lest one memory cooperating therewith to
    store identities of accepted advertisers,
    identify the given entity contacted by the outgoing communication based upon the telephone number,
    identify at least one property associated with the given entity and comprising a business category, and
    selectively send a targeted advertisement to the at least one mobile wireless device based upon the at least one property and the accepted advertisers, and a duration and frequency of the corresponding contact.

19. The advertising server of claim 18 wherein said processor and at least one memory further cooperate to store a contact history for the at least one mobile wireless communications device, and selectively send the targeted advertising based upon the contact history.

20. The advertising server of claim 18 wherein said processor and at least one memory further cooperate to identify the given entity based upon a separate communication with the at least one mobile wireless communications device.

21. The advertising server of claim 18 wherein said processor and at least one memory further cooperate to identify the given entity based upon a communication between the at least one mobile wireless communications device and the given entity.

22. The advertising server of claim 18 wherein said processor and at least one memory further cooperate to selectively send the targeted advertisement after the corresponding contact.

23. The advertising server of claim 18 wherein the targeted advertisement comprises at least one of an audio message and a visual message.

\* \* \* \* \*